(12) United States Patent
King

(10) Patent No.: US 6,791,490 B2
(45) Date of Patent: Sep. 14, 2004

(54) INTEGRATED DIVE FLAG/FLOAT AND GPS NAVIGATION SYSTEM FOR SCUBA DIVERS

(76) Inventor: Joseph David King, 2715 Cozumel Dr., Apt 1703, Melbourne, FL (US) 32935

( * ) Notice: Subject to any disclaimer, the term of this patent is extended or adjusted under 35 U.S.C. 154(b) by 45 days.

(21) Appl. No.: 10/113,534

(22) Filed: Mar. 29, 2002

(65) Prior Publication Data

US 2002/0140599 A1 Oct. 3, 2002

Related U.S. Application Data

(60) Provisional application No. 60/280,252, filed on Mar. 30, 2001.

(51) Int. Cl.[7] .............................. G01S 5/14; B63B 7/26; B63B 22/18
(52) U.S. Cl. .............................. 342/357.02; 342/357.08; 441/11; 441/26
(58) Field of Search ....................... 342/357.02, 357.03, 342/357.06, 357.17, 357.08; 441/33, 11, 23, 24, 26; 367/910; 405/185–191, 194

(56) References Cited

U.S. PATENT DOCUMENTS

| | | | | |
|---|---|---|---|---|
| 4,756,486 A | * | 7/1988 | Campbell | 242/396.9 |
| 5,067,920 A | * | 11/1991 | Brisky | 441/25 |
| 5,406,294 A | * | 4/1995 | Silvey et al. | 343/709 |
| 5,520,486 A | * | 5/1996 | Van Wyck | 405/186 |
| 5,570,323 A | * | 10/1996 | Prichard et al. | 367/118 |
| 5,640,922 A | * | 6/1997 | Feldkamp et al. | 114/315 |
| 5,691,957 A | * | 11/1997 | Spiesberger | 367/3 |
| 5,782,663 A | * | 7/1998 | Van Raden | 441/25 |
| 6,093,069 A | * | 7/2000 | Schelfhout | 441/11 |

* cited by examiner

Primary Examiner—Gregory C. Issing
(74) Attorney, Agent, or Firm—Joseph D. King (57) ABSTRACT

A SCUBA diving flag/float assembly is used to support a GPS antenna on the surface of the water for use by divers in performing underwater navigation. An associated GPS receiver is integrated with a dive flag line take-up mechanism such as a spool or SCUBA diving line reel. The dive flag line and cable interconnecting the GPS receiver to the GPS antenna is integrated within a single assembly, or in an alternate embodiment, braided together forming a single tether. Alternate embodiments include optional sensors such as a flowmeter, compass, tiltmeter, depth gauge and diver techniques to compensate for navigational errors due to a water current pushing a dive flag/float away from a diver. Alternatively, a GPS receiver may be mounted on or in the dive flag/float assembly and navigational information relayed to the diver under the water.

18 Claims, 13 Drawing Sheets

INTEGRATED DIVE FLAG/FLOAT AND GPS NAVIGATION SYSTEM FOR SCUBA DIVERS

CROSS REFERENCE TO RELATED APPLICATIONS

This application claims the benefit of an earlier filing date under 35 U.S.C. §119 (e) of U.S. Provisional Patent application Serial No. 60/280,252 filed on Mar. 30, 2001, which is hereby incorporated by reference in its entirety.

TECHNICAL FIELD

The present invention relates in general to 1) navigation technology used to aid SCUBA divers in navigating while diving and 2) SCUBA diving flags required by law when diving.

BACKGROUND ART

Safety is strongly influenced by the ability to navigate while underwater. Many divers become lost and/or disoriented while SCUBA diving every year. Some of those lost divers do not survive due to complications that arise as a result of becoming lost (e.g. running out of air). One of the most common dive scenarios is one where a diver enters the water from a boat with the intention of returning to the boat after the dive. Far too many times, divers surface far from the boat as a result of becoming completely lost while underwater. The resulting surface swim can be very strenuous causing a diver to become exhausted or possibly to have a heart attack, and require rescuing. SCUBA divers are taught basic navigation using a magnetic compass at multiple levels of course instruction from novice to advanced. The patterns taught to divers are very basic such as straight lines, and square boxes. Divers are not taught effective techniques to compensate for water currents, and are only taught very basic knowledge of how to maintain proper positioning of the compass in inertial space. Human beings are not very good navigation computers as they cannot repeatedly place a compass in precisely the same attitude, cannot compensate for hard and soft iron effects in their heads, cannot remember a multitude of turns (changing headings) nor easily calculate a return heading after an actual dive (other than straight out and back). The task of underwater navigation is further complicated by environmental factors such as visibility, lack of bottom features (e.g. barren sandy bottom) and/or water currents. Other factors that exacerbate underwater navigation by divers is loss of concentration/awareness due to excitement, task loading, photography or harvesting sealife (e.g. lobster, spearfishing etc.). Appreciation for the navigation problem for SCUBA divers has spawned a multitude of systems being designed. Most systems employ a system of acoustic transponders and/or beacons to communicate with a receiver held by a diver (U.S. Pat. No. 5,185,725 Kent et al, U.S. Pat. No. 5,570,323 Prichard et al, U.S. Pat. No. 5,241,516 Kruchowy et al, U.S. Pat. No. 5,148,412 Suggs). These systems, though adequate, are simply unaffordable to the common recreational or technical diver and are intended for use by mostly commercial and/or military divers. Additionally, a transponder-based system requires a network of transponders to provide navigation/location information to the diver. Such a transponder network is not easily retrieved and redeployed. Also, the divers simply deploying or retrieving the transponders could easily become lost themselves. A system that is self-contained and is not dependent upon local infrastructure is optimum. Self-contained navigation systems for SCUBA divers have been proposed. One system proposed by Wood, U.S. Pat. No. 5,747,700, employs the well-known combination of a flowmeter and a magnetic compass. However, Wood's system, though self-contained, has a number of sources of error. The system proposed by Wood does not compensate for water currents. For example, a diver may be swimming north at 50 feet/second (fps) which Wood's flowmeter may correctly register. However, if the diver is crabbing east at 20 fps, Wood's design will not detect the cross current. Additionally, Wood uses a single compass, and a single flowmeter. With exception of regions over the magnetic poles and the equator, the earth's magnetic field has both a vertical and a horizontal component. Unless at least two orthogonally mounted sensors are used, (or the divers precise attitude in inertial space, e.g. pitch and roll angles is known) a divers varying attitude will cause a single compass to read portions of both components, and thus provide incorrect heading information. Additionally, Wood's system does not compensate for hard and/or soft iron effects on the magnetic compass that are normally present in a iron shipwreck, pipelines or underwater cables. In addition to the temporal nature of water currents, large objects such as shipwrecks distort water currents even further.

A system that is affordable, self contained, can compensate for water currents, and is not easily affected by large magnetic anomalies, and does not add additional infrastructure is needed. Preferably, the system would not require a diver to carry additional equipment so as not to further task load the diver.

SUMMARY OF THE INVENTION

A system that is affordable, self contained, can compensate for water currents, is not easily affected by large local magnetic anomalies, and does not require a diver to deploy/retrieve local infrastructure is simply the Global Positioning System (GPS). Unfortunately, the L-band GPS signal cannot penetrate water very deeply, especially salt water.

The invention herein teaches a navigation system for use by submerged SCUBA divers wherein a GPS system is integrated with a SCUBA diving flag. In a preferred embodiment, a divers true geographic position is corrected for a separation between the diveflag/GPS assembly and the diver.

The invention taught herein does not necessarily require a diver to purchase additional equipment, but exploits the GPS constellation by simply modifying equipment already owned by most divers. In almost all dive locations, a SCUBA diver is required by law to tow a nationally or internationally approved dive flag while SCUBA diving unless diving off a boat that is currently flying an approved dive flag. Consequently, most divers either own a dive flag or will purchase one.

DETAILED DESCRIPTION OF THE INVENTION

Figure 1:
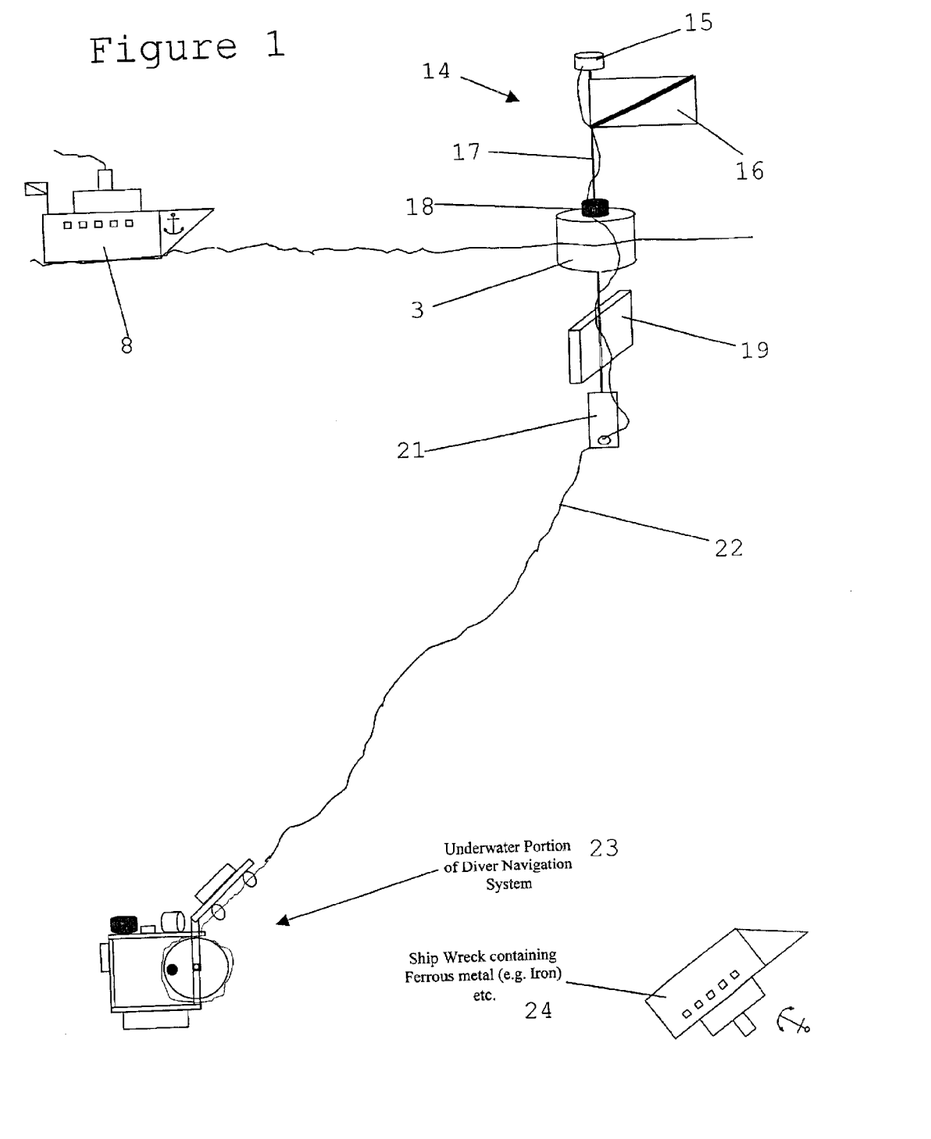
FIG. 1 is a system level diagram of one embodiment of the invention

Referring to FIG. 1, virtually all dive flags 16 towed by divers are attached to a float 3 assembly. The float assembly 3 includes a pole, or support dowel 17 to which the dive flag 16 is attached. The dive flag/float assembly 14 may include ballast 21 for stabilizing the pole 17 and dive flag 16 in an upright fashion. The float portion 3 is usually a foam material, or other solid material. Some dive flag assemblies 14 have floats made of inner tubes that are filled with air. The inner tubs are filled at a service station or the dive store prior to arriving at the dive site. Under no circumstances are inner tubes used as floats for dive flags, inflated and/or deployed by a diver who is already underwater. This represents a significant hazard to the diver.

Figure 6:
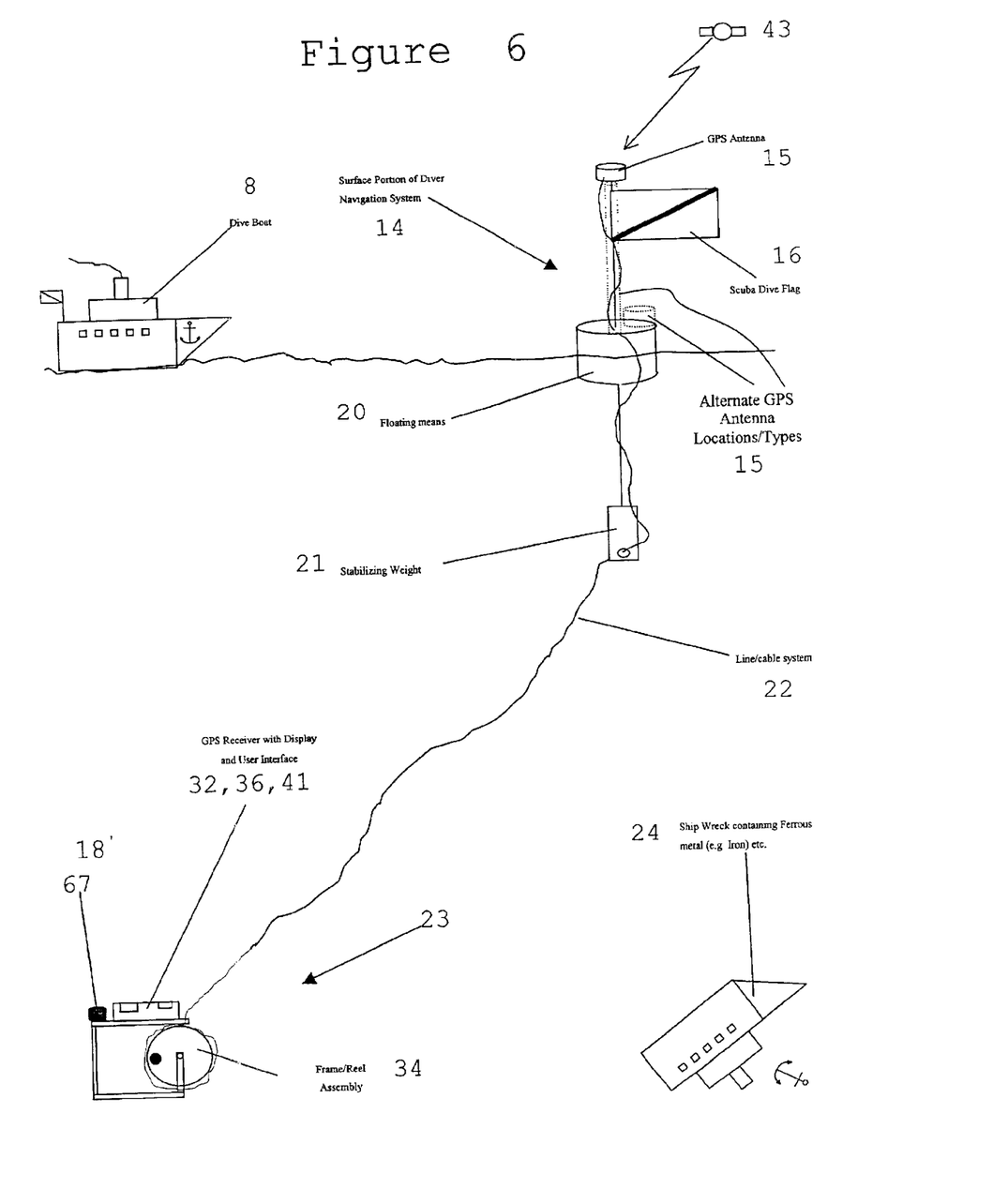
FIG. 6 is an alternate embodiment of the invention of FIG. 1
Figure 7:
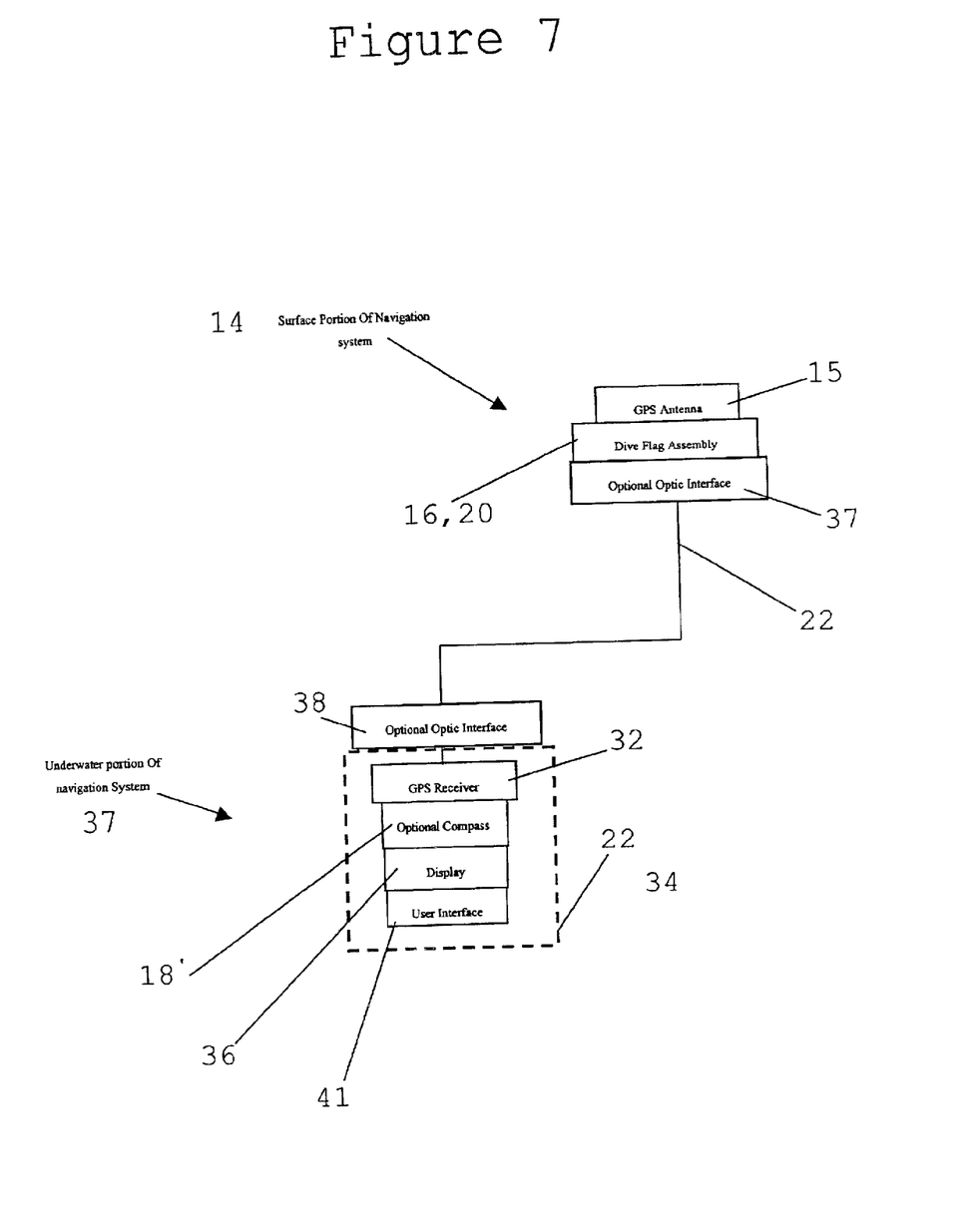
FIG. 7 is a system block diagram of the system shown in FIG. 6

A GPS antenna 15 is mounted on, to or in dive flag/float assembly 66. Antenna 15 is shown mounted on top of pole 17 in FIG. 1, and may be a patch antenna as is known in the art. Alternatively, antenna 15 may be mounted elsewhere on dive flag/float assembly 14 as shown in FIG. 6. In fact pole 17 may be used to enclose a well known GPS antenna referred to as a CHO antenna. Alternatively, antenna 15 may be mounted on float 3. Or, conversely, the entire GPS antenna/receiver device may be mounted on, to or in the dive flag/float assembly 66, and location information relayed down to a submerged diver. Further, the GPS antenna 15 (and/or the GPS receiver) may be embedded within a potion of the dive flag/float assembly. This would serve to waterproof the system as well as other advantages. Location information calculated by the GPS system is provided to a submerged diver thereby allowing a diver to know his/her geographic position. Prior to entering the water to begin a dive, a diver would initialize the GPS system with a starting location. While diving, the GPS system would provide navigation information to the diver so the diver may navigate back to the starting location at the end of the dive. Further, the GPS system may be integrated with known dive computers that monitor the amount of gas in a divers SCUBA tank and the rate at which a diver consumes the gas in the tank. This can be used to provide a diver with information such as he/she cannot get back to the starting point with the remaining gas. A measure of how much time a diver has left to progress away from the starting point before having to turn back, can be provided. This way a diver can head back to the starting point before a dangerous situation develops. The system can be used as follows: The diver uses the system to determine and store a starting location of dive boat 8 (or other beginning location such as a dock) in system memory. The diver tows the SU 14 along the surface as the dive progresses. When the diver is ready to return to the point of origin (or any other stored waypoint) the diver actuates a switch 44 (and/or other feature(s)) on the DU user interface 41 to calculate the required heading and distance to return to the point of origin or next waypoint using an LCA angle $\alpha$ or $\beta$, DU water depth 5, length 4 of LCA 22 deployed between the DU 23 and the SU 66, or any combination of these parameters. The diver then follows the heading provided by the system that has been corrected for error 6 separating the SU from the DU. This process may be repeated any number of times while diving.

Antenna 15 receives navigation information from a plurality of satellites (one satellite is shown in FIG. 6 as 43) as is well known in the art. Electrical signals containing location information from antenna 15 is conducted via line cable assembly 22 to an underwater portion 23 that presents navigation data to the diver.

Figure 2:
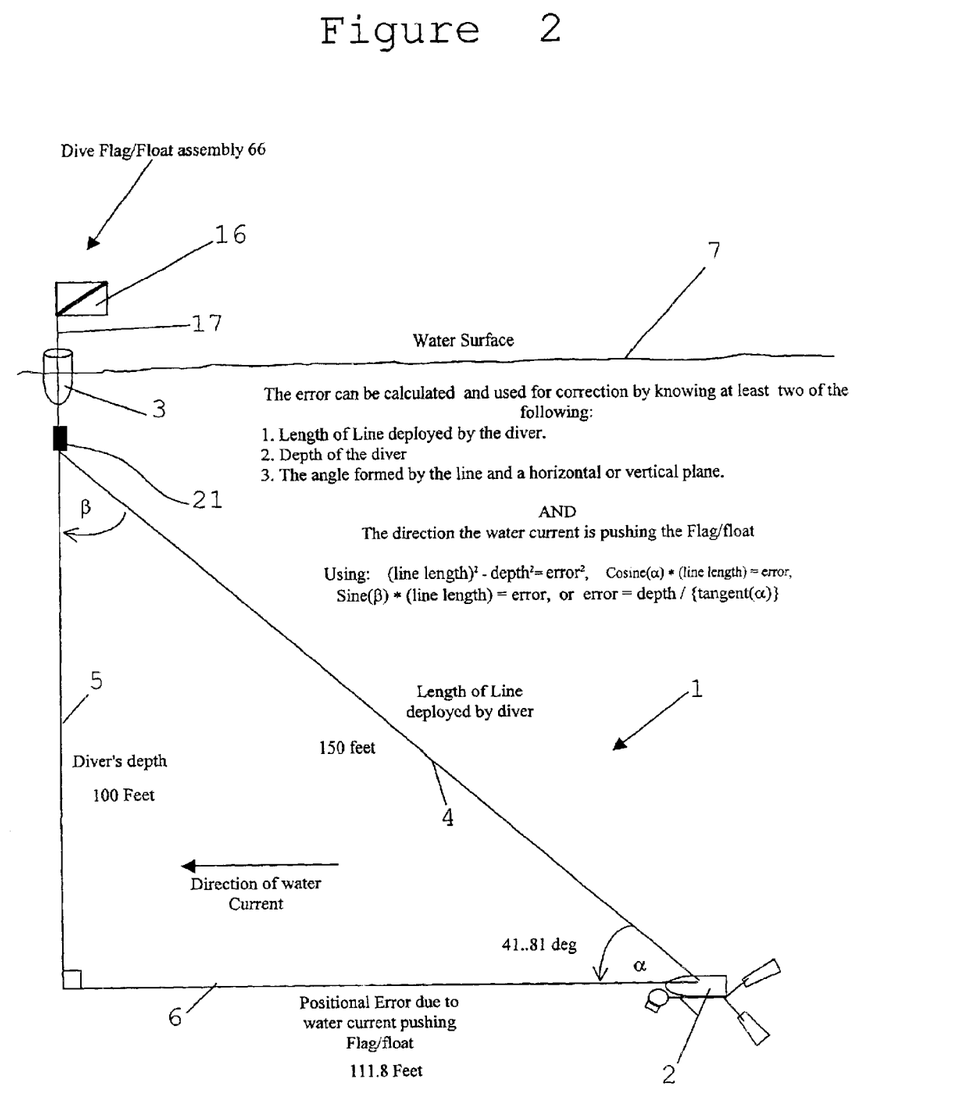
FIG. 2 is a drawing showing the effect of water current on dive Flag/antenna position

Referring to FIG. 2 a diver 2 is shown submerged below the surface of water 7. A diver 2 at a depth 5 is often separated from dive flag/float assembly 14 due to water current pushing the flag assembly 14 away from diver 2. Since GPS provides the geographic location of the GPS antenna 15 an error 6 can result. In the example shown, a length of line 4 extends between diver 2 and dive flag/float 66. The line length 4 in this example is 150 feet. The depth 5, is 100 feet, and may be provided by dive computers or depth gauges as is well known which may also be integrated with the GPS system in accordance with the invention herein. The error 6 is about 112 feet as is calculated by well known trigonometric methods. For a diver low on air, or a poor surface swimmer, 112 feet can be a risk to a divers safety as far as getting back to a dive boat 8. Error 6 is cumulative to a distance from dive boat 8 in the event diver 2 is completely lost and is far from boat 8 (not shown).

Figure 3:
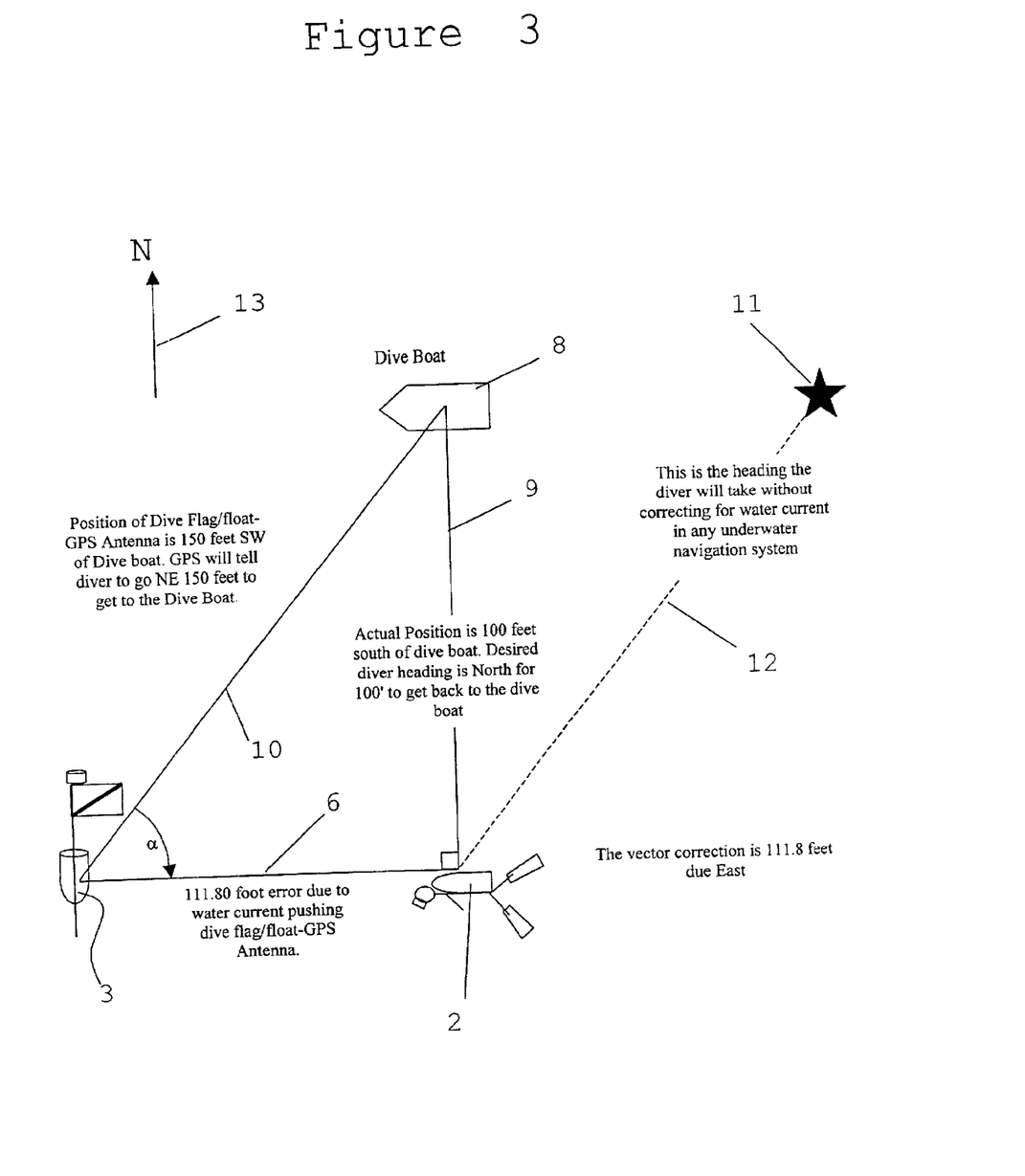
FIG. 3 is a drawing showing the effect of uncompensated error due to water current pushing a dive flag/antenna (or diver) on a navigation system heading

FIG. 3 is a plan view of the navigation problem shown in FIG. 2. Diver 2 is 100 feet due south of boat 8 and desires to return to the boat 8 (in practice, this distance may be as far as several hundred feet or more). Diver 2 does not know his location with respect to boat 8. Due to a westerly water current, flag/float 66, having antenna 15, is pushed away from diver 2 by 112 foot error 6 described above. Without compensating for error 6, a GPS system will instruct diver 2 to swim northeast along path 12 to arrive at what diver 2 thought was boat 8, but is actually location 11, that is far from boat 8. This is because the GPS system did not know error 6 exists.

Figure 4:
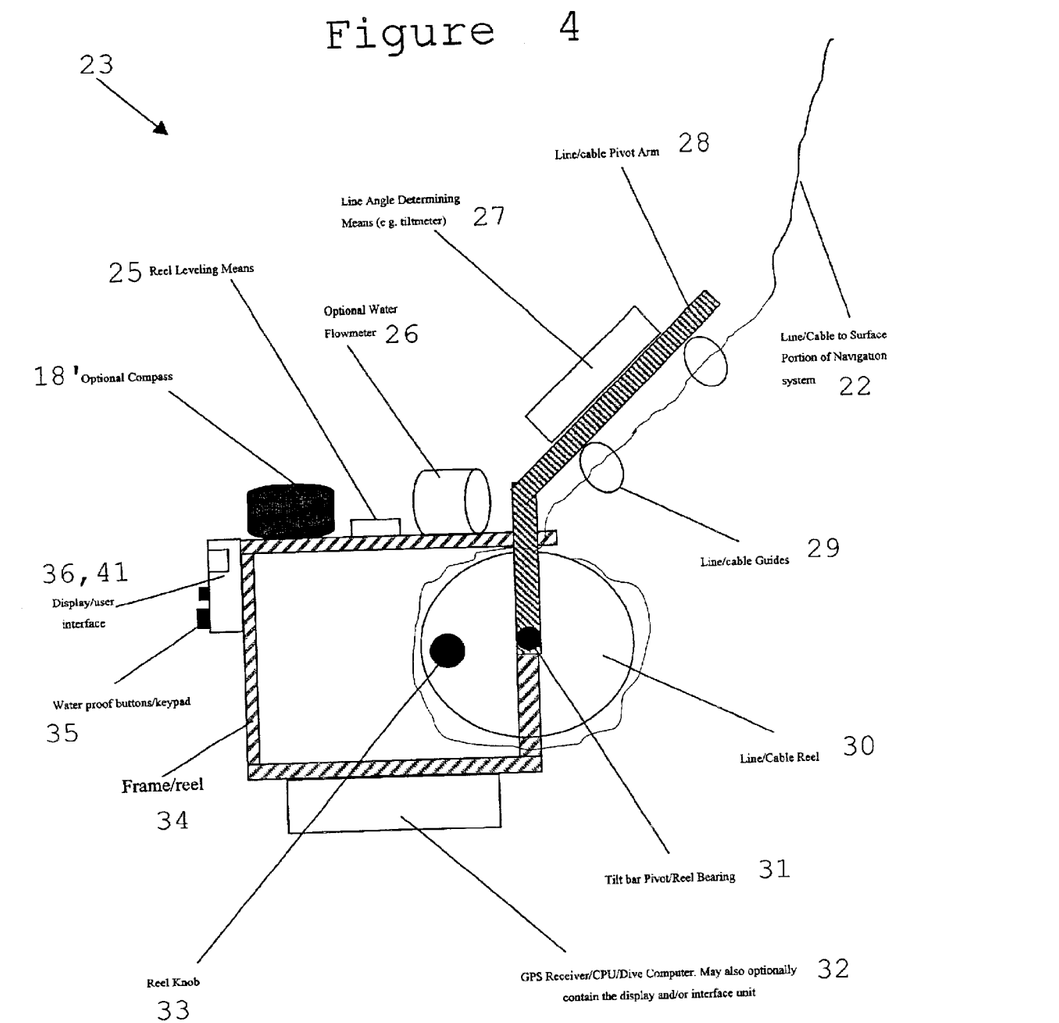
FIG. 4 is a diagram of the diver held portion of the system shown in FIG. 1
Figure 5:
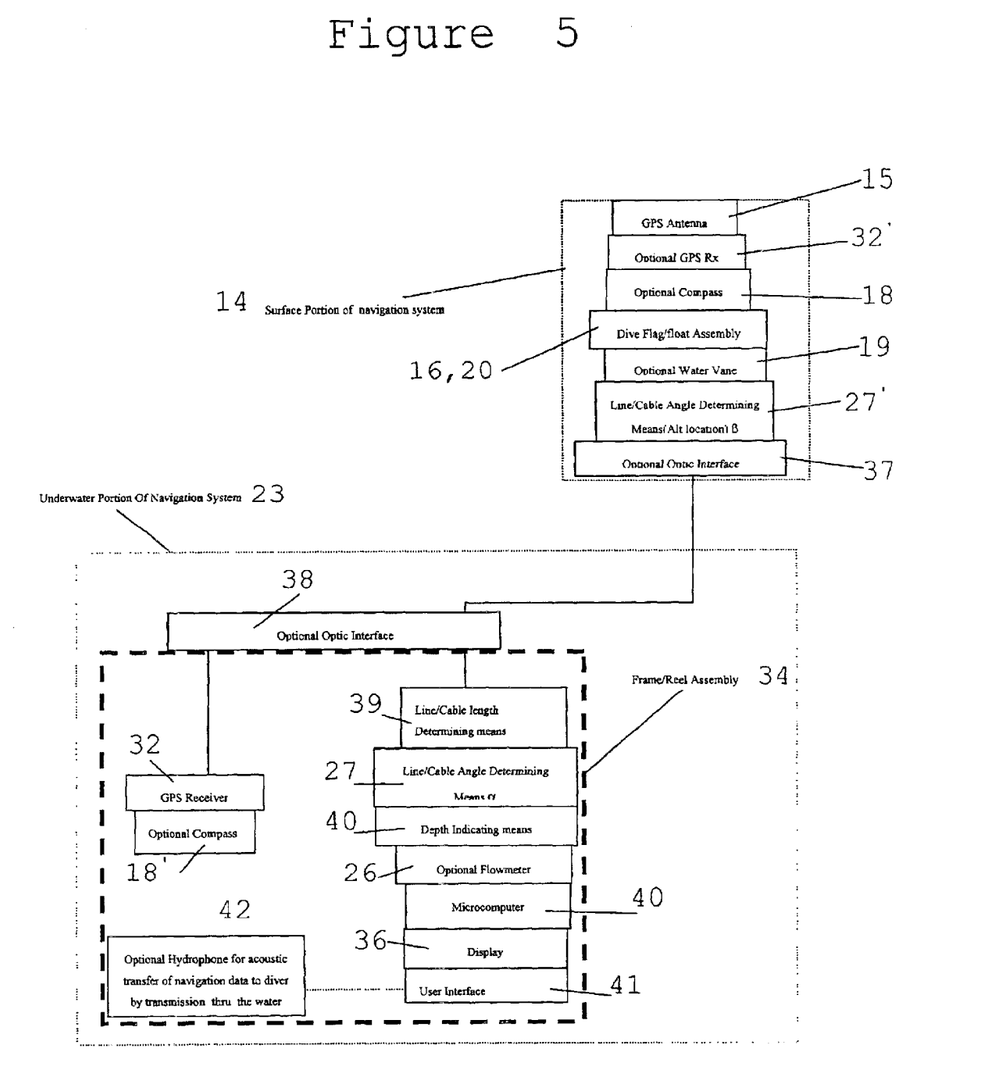
FIG. 5 is a system block diagram of the system shown in FIG. 1 and FIG. 4

Well-known trigonometric methods may be employed using information from a variety of sensors to determine and compensate for error 6 as shown in FIGS. 2, 4 and 5. Sensors may include, but are not limited to are magnetic compass 18, flowmeter 26, tiltmeter 27 (or other means for determining tilt of line 22), line length determining means 39 (e.g. line counter), depth gauge 40 and/or a water current vane 19, some, or all of which, may be used to determine a correction vector to compensate for error 6.

Angles $\alpha$ or $\beta$ as shown in FIG. 2 may be determined by using a tiltmeter 27 deployed on flag/float assembly 14 or on the underwater portion 23 and line cable pivot arm 28 as shown in FIG. 4. Angle $\beta$ is the preferred angle because a diver 2 need not worry about having to keep underwater portion 23 level so as to ensure angle $\alpha$ is accurately measured. FIG. 4 shows one method of determining a angle $\alpha$ between the LCA 22 and a horizontal plane (e.g. a level DU 23 or a flat ocean bottom) using a arm or bracket 28 piviotedly mounted to the DU 23 and supporting a tiltmeter 27 (alternatively, the angle determining apparatus may be affixed to the dive flag/float assembly 66). Optic methods (or other means) are also possible with a light source (e.g. LED) mounted on a pivot that is free to rotate in close proximity to, and pointed towards, a semi-circle formed by a plurality of photodetectors similar to a weight suspended from a string and hanging down next to a protractor to measure angles visually.

A rheostat or potentiometer where the wiper arm rotates as a function of angles $\alpha$ or $\beta$ with respect to line 22 may also be employed. Strain gauges, and LEDs & photo detectors may be used to determine angles $\alpha$ or $\beta$ with respect to line 22.

Figure 9:
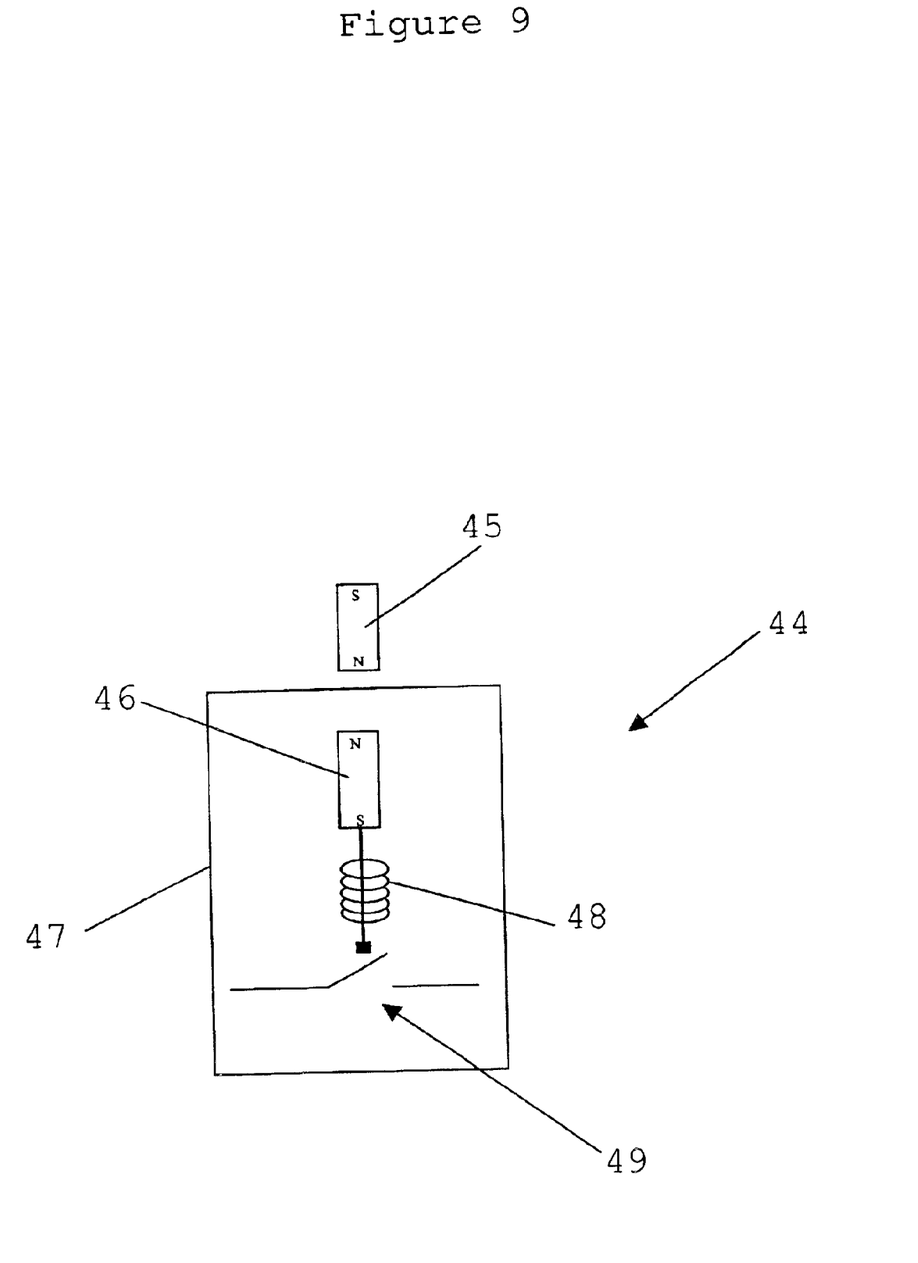
FIG. 9 shows a waterproof switch for use with the invention

An azimuth direction relative to diver 2 and SU 14 may determined from compass 18 with or without using flowmeter 26. Using flowmeter 26, diver 2 simply rotates DU 23 (and hence flowmeter 26) about a yaw axis until a maximum water velocity is determined. The azimuth direction corresponding to the maximum water velocity is the direction dive flag/float (SU) 14 is offset from diver 2. Alternatively, if diver 2 is in shallow water and/or water visibility allows diver 2 to visually observe the direction dive flag/float 14 is offset from diver 2, the diver need only point compass 18 in the direction of flag/float 14 to obtain the azimuth direction. The diver may then press a switch 44 on the DU 23 to store the heading in CPU memory for later use. Knowledge of the divers (DU) depth underwater can also be used as shown in FIG. 1 to help determine the offset between the SU and the DU by including an optional depth gauge with the system as shown in FIG. 5. Alternatively, the diver may also enter the depth (or any other required information) into the system via the user interface unit as shown in FIG. 4 using a waterproof keypad or switch 44. One embodiment of a waterproof switch is shown in FIG. 9.

Once a relative heading (e.g. azimuth direction) of flag/float assembly 14 from diver 2 is obtained, a correction vector may be calculated by the GPS system. Some of the ways error 6 may be calculated as shown in FIG. 2 are:

1) Sine($\beta$)*Line length=error
2) Cosine ($\alpha$)*line length=error
3) error=(water depth)/tangent ($\alpha$)
4) square root [(line length^2)−(depth^2)]=error (when line length 4 is greater than depth 5)

Other methods such as, but not limited to, Side-Angle-Side, ASA etc as is well known in geometry and/or trigonometry may also be used to calculate error 6.

A GPS antenna integrated with a dive flag as shown in FIG. 1 would allow error 6 (in meters or feet) to be taken into account in determining a total navigation solution. As is known in the art, a GPS system reports the latitude and longitude (e.g. the position) of the antenna, not the receiver. Consequently the separation between the antenna and the diver must be taken into consideration in order to preclude the diver from being given the wrong heading as shown in FIG. 3. The magnitude of error 6 is dependent upon the magnitude of the water current, and the divers depth 5.

Additionally, many divers own penetration reels (required for many dive courses) for use in cave diving, shipwreck diving, search and recovery patterns, and sending lift bags to the surface. A penetration reel is simply a reel, much like a fishing reel, having many feet of line wound onto. A diver, prior to entering an overhead environment such as a shipwreck or underwater cave, attaches a free end of the line to the entrance point. As the diver penetrates deeper into the wreck or cave he/she unwinds the line from the reel. When the diver desires to return, he/she simply follows the line back to the entrance while winding up the slack line.

FIG. 4 shows the diver-held portion 23 of the navigation system of FIG. 3 having penetration reel assembly 34. FIG. 5 is a block diagram of the system shown in FIGS. 1 and 4. A compass is included as part of the diver unit (DU) 23 for determining the direction of the dive flag from the diver.

An optional level 25 may be added to ensure compass 18 reads only the horizontal component of the earth's magnetic field for accuracy. Optionally, three mutually orthogonal mounted magnetic field sensors (e.g. flux valves, hall effect, variable inductive coils etc.) may be used in lieu of a compass 18 and level (not shown). This method measures both the vertical and horizontal components of the earth's magnetic field regardless of DU 23 attitude in inertial space and yields the correct heading as is well known in the art of inertial navigation.

Additionally, multiple flowmeters mounted at different azimuth angles may also be used with some simple trigonometric relations to aid in determining a cross axis water current direction relative to a direction diver 2 is swimming.

Figure 10:
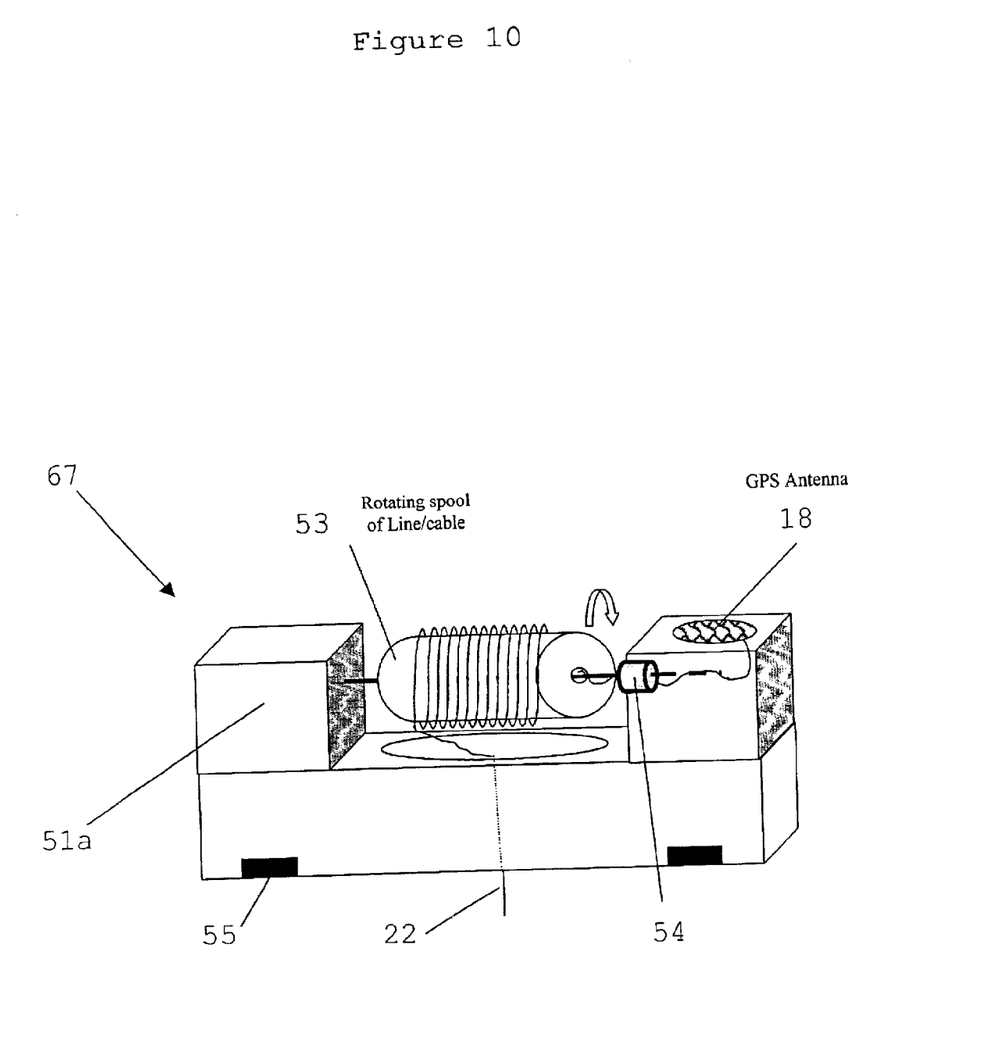
FIG. 10 Shows a rapidly deployable Antenna/float system for use with the invention
Figure 11:
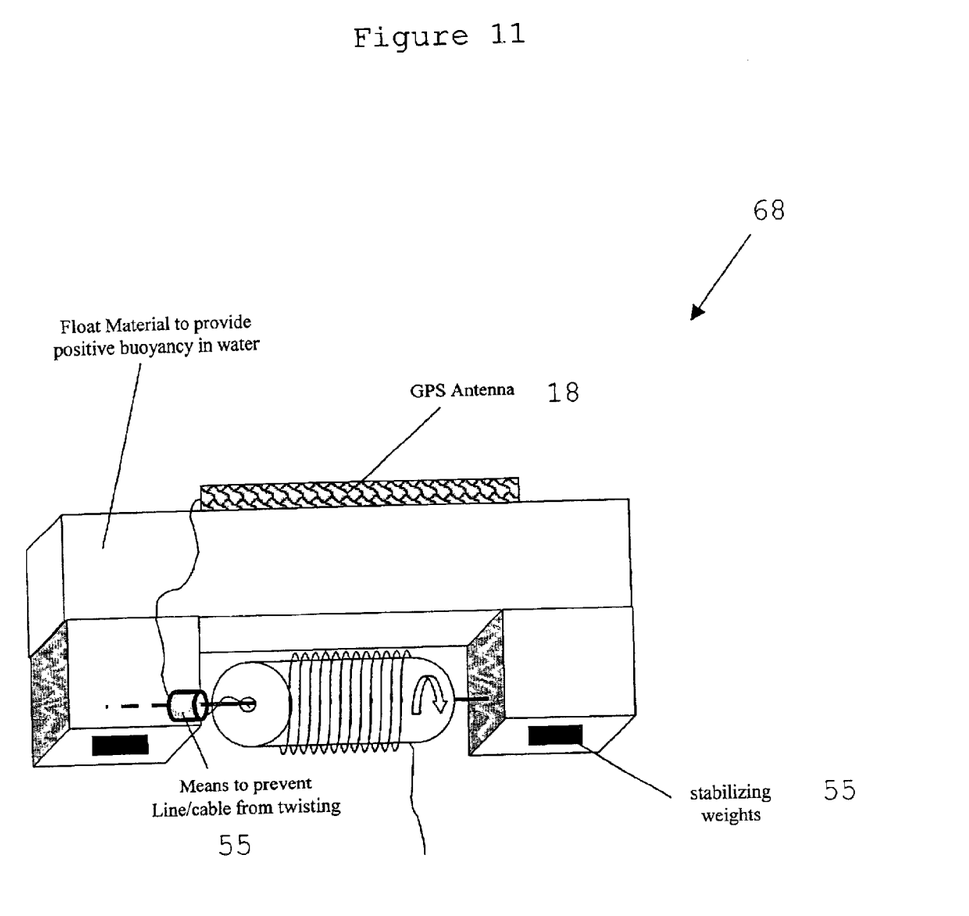
FIG. 11 is an alternate embodiment of the system shown in FIG. 10
Figure 12:
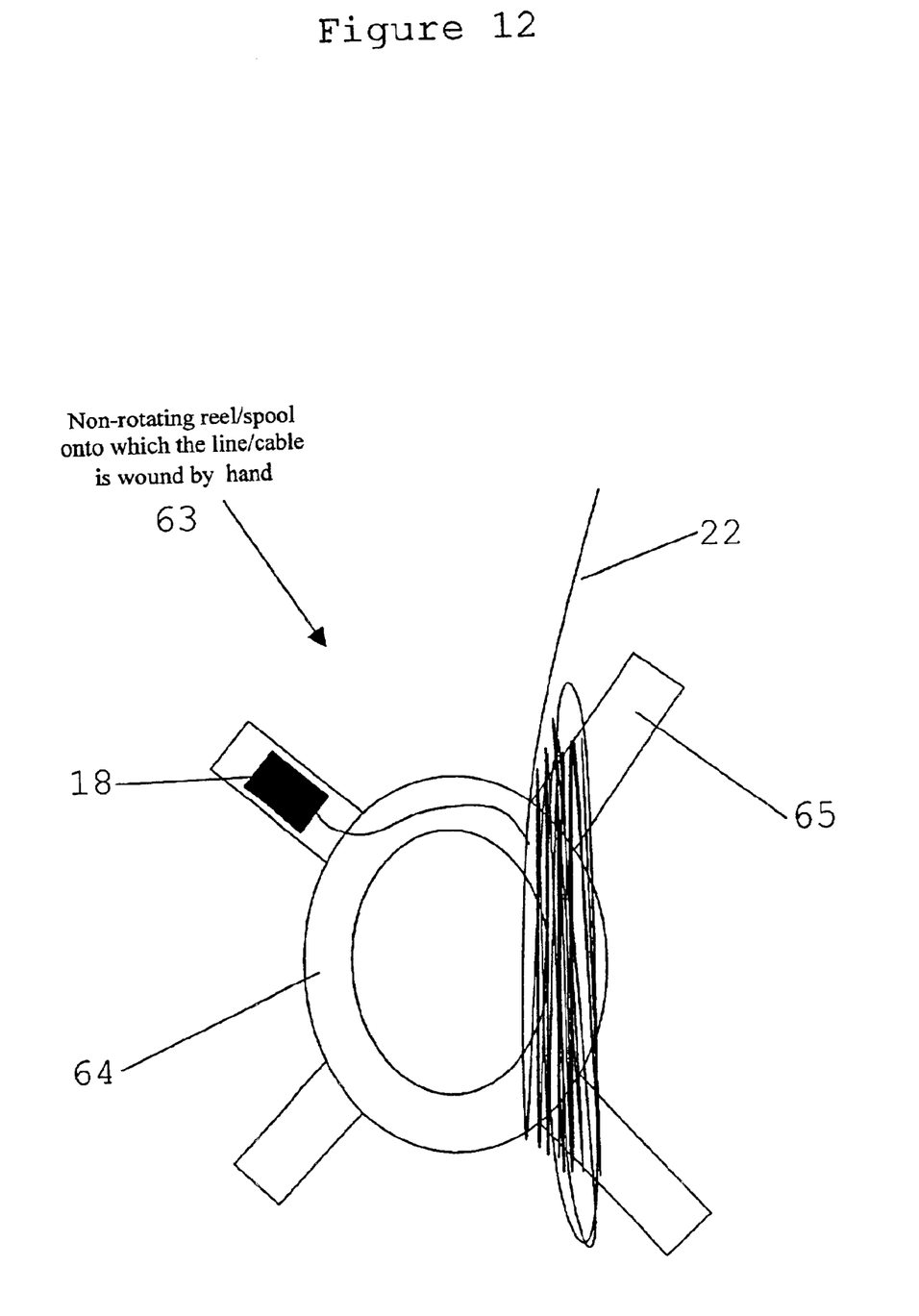
FIG. 12 shows one embodiment of a non-rotating line take-up reel for use with the invention of FIG. 1 or 6

Alternatively, the SU 14 (without a dive flag) does not have to be towed on the surface while diving. When the diver is ready to return to the boat (or to navigate to another waypoint) the diver would simply deploy a miniature version of the SU shown in FIGS. 10 and 11. This system may optionally contain any or none of the additional sensors described herein for compensating for water current. The mini-SU (MSU) 67 or 68 is rapidly deployable in the same fashion as a diver would deploy a Pelican™ float. The MSU is positively buoyant, made from a solid or semi-solid (e.g. blown foam plastic etc.) material so that it ascends to the surface unassisted and floats. While rising to the surface, LCA 22 is payed out from a rotating spool on the MSU 67 or 68 (or alternatively, LCA 22 is manually unwound by diver 2 from a spool 63 shown in FIG. 12) which is connected to the diver held DU. The MSU 67 or 68 has weighting means 55 offset from the center of gravity of the MSU, opposite from GPS antenna 15 and/or GPS Rx, so that the GPS antenna 15 points upward toward the sky when it reaches the surface. The antenna is enclosed within a hydrophobic material or coating to shed water so as not to interfere with reception of the GPS signal. The DU 23, SU 66, or MSU 667, 68 may contain a non-rotating reel or spool 63 so a problem of line (LCA) 22 twisting may be avoided. FIG. 12 shows one embodiment of a non-rotating reel 63 where the diver would simply wind (or unwind) the LCA 22 from the reel.

Figure 13:
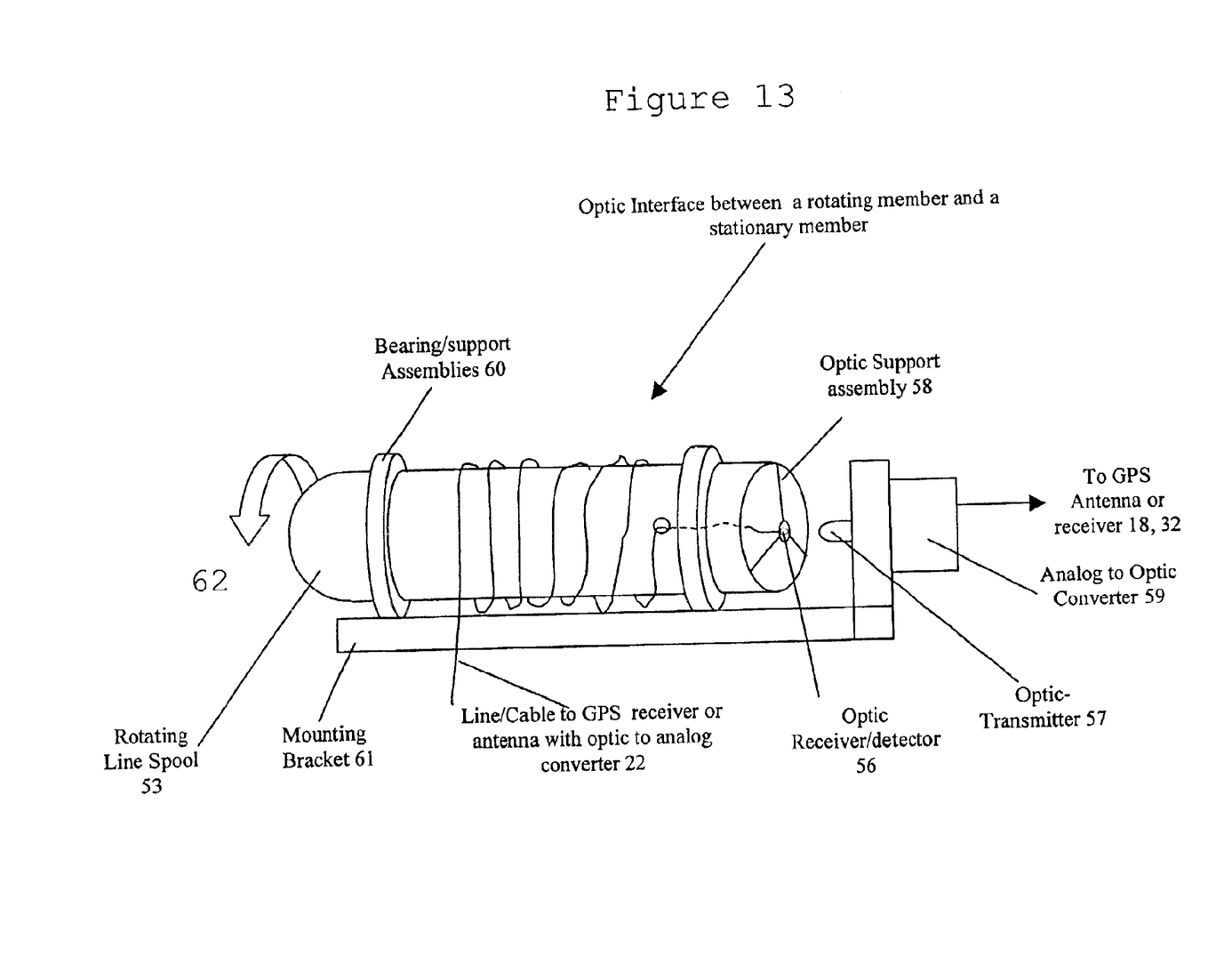
FIG. 13 shows an optic interface for use with a rotating reel and/or antenna spool

The present invention also includes means for preventing the LCA from twisting when a rotating reel/spool is used similar to a common fishing reel. One embodiment is shown in FIG. 13 using a optic transmitter and associated optic receiver such as LED or laser diode, and a photo detector such as photodiode or phototransistor.

Figure 8:
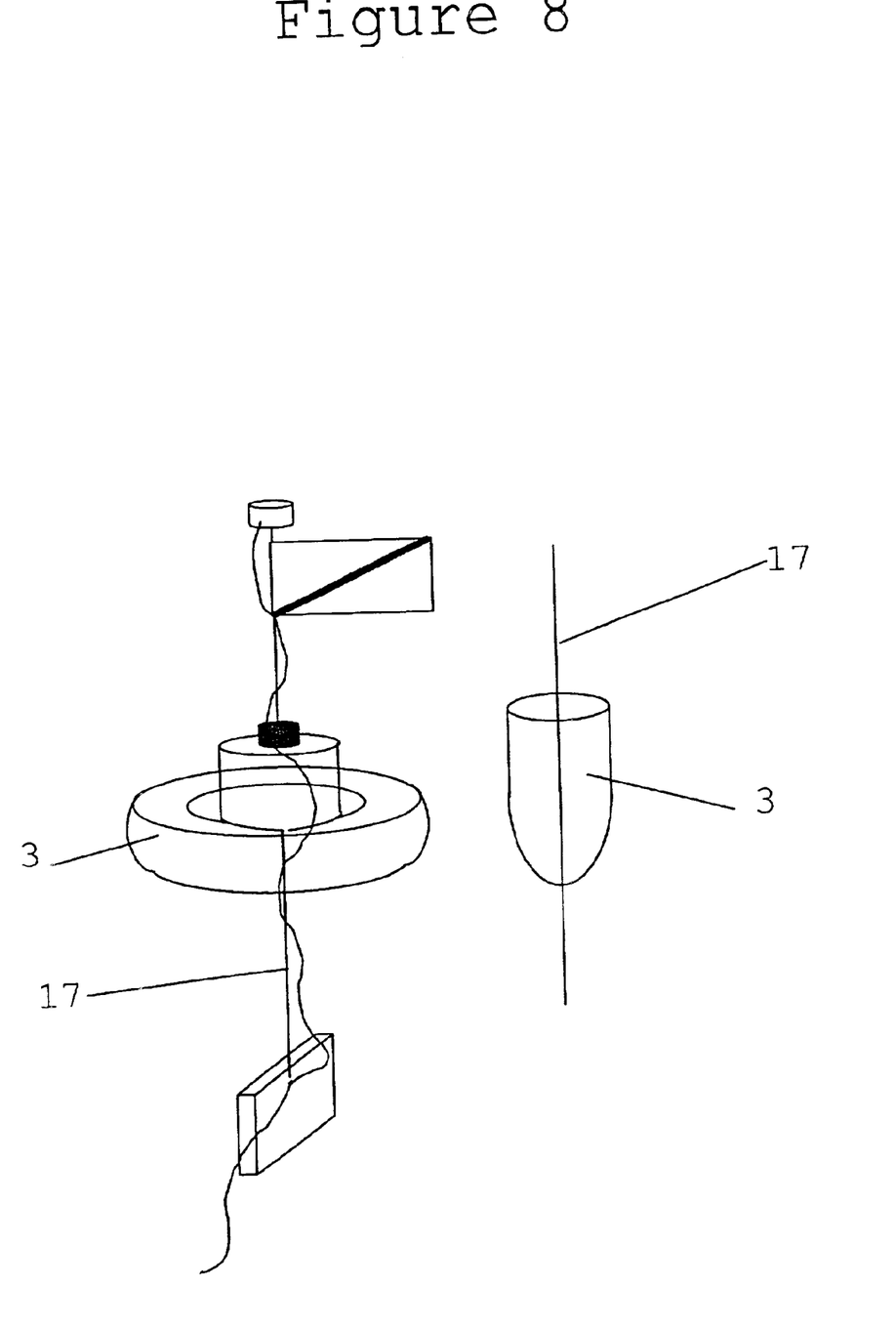
FIG. 8 shows different types of floats for use with the invention

The type of float 3 used with the SU 14 may be of almost any design, with some common types shown in FIG. 8.

Advantages of the invention herein includes water current compensation, errors due to crabbing are removed, and the system is unaffected by magnetic anomalies as the system is based on GPS.

In accordance with the provisions of the patent statutes and jurisprudence, exemplary configurations and combination of elements herein as described above are considered to represent a preferred embodiment of the invention. However, it should be noted that the invention can be practiced otherwise than as specifically illustrated and described without departing from its spirit or scope.

What is claimed is:

1. A system for navigating underwater comprising:
   an antenna operative to receive at least one GPS signal;
   a dive flag apparatus operative to support said antenna on or above a surface of water, said dive flag apparatus comprising;
   a SCUBA diving flag;
   a float having positive buoyancy relative to said water;
   a receiver, said receiver operative to process said at least one GPS signal;
   a signal conducting tether cable having a first end couples to said dive flag apparatus, a second end coupled to a reel or spool for collecting and dispensing said signal conducting tether cable, said signal conducting tether cable for towing and controlling said dive flag apparatus under the control of a diver; and
   an angle sensor mounted on or in said dive flag apparatus, said angle sensor for determining an angle between said signal conducting tether cable and said dive flag apparatus, said angle used to calculate a correction vector between a diver location and a location of said dive flag apparatus, and wherein a navigation solution presented to said diver is compensated using said correction vector.

2. The system of claim 1 further comprising a means for determining a geographic direction between said diver and said dive flag apparatus, said geographic direction used for determining said correction vector between said diver and said dive flag apparatus.

3. The system of claim 2 wherein said means for determining a geographic direction is a compass or a multiaxis magnetic field sensor.

4. The system of claim 3 further comprising a means for determining a length of said signal conducting tether cable deployed between said diver and said dive flag apparatus, said length used for determining said correction vector between said diver and said dive flag apparatus.

5. The system of claim 1 further comprising a ballast, said ballast located such that said ballast is operative to stabilize said dive flag apparatus such that said antenna and said dive flag are positioned upright and above said surface of said water.

6. The system of claim 5 wherein said ballast is an inner tube filled with air.

7. The system of claim 1 wherein said antenna is enclosed in a hydrophobic material that is transparent to said GPS signals.

8. The system of claim 1 wherein said second end of said signal conducting tether cable is operatively coupled to said receiver, said receiver mounted on or to said reel.

9. A dive flag apparatus operative to support an antenna on or above a surface of water, said dive flag apparatus comprising;
   a SCUBA diving flag;
   a float having positive buoyancy relative to said water;
   a support pole having at least a portion thereof embedded in; or attached to, said float, said support pole operative to support at least a portion of said SCUBA diving flag;
   an antenna operative to receive at least one GPS signal, said antenna mounted to, on, or in said support pole, or on, to, or in said float;
   a signal conducting tether cable having a first end coupled to said antenna, a second end coupled to a diver operated reel or spool for collecting and dispensing said signal conducting tether cable;
   a receiver operatively coupled to said antenna for receiving GPS signals; and
   an angle sensor coupled to said diver operated reel or spool, said angle sensor operative to determine an angle between said cable and a horizontal plane, said angle used to calculate a correction vector between a diver location and a location of said float, and wherein a navigation solution presented to said diver is compensated using said correction vector.

10. A method of underwater navigation by a SCUBA diver comprising the steps of:
    determining and storing an first geographic location in computer memory;
    deploying a float assembly containing a GPS antenna and a SCUBA dive flag apparatus on a surface of a body of water;
    determining a length of a signal conducting tether cable deployed from a SCUBA diver to the float;
    providing an angle sensor mounted on said SCUBA dive flag apparatus or a SCUBA diver operated reel or spool;
    determining an angle of the signal conducting tether cable with respect to a horizontal plane using said;
    determining and storing a second geographic location in said computer memory;
    correcting said second geographic position using said cable length and said cable angle information; and
    determining and presenting a direction to proceed as calculated using said first geographic location and said correction second geographic location to said SCUBA diver.

11. A method of underwater navigation by a SCUBA diver comprising the steps of:
    providing a signal conducting tether cable having a first end operatively coupled to a GPS antenna supported on a surface of water, a second end operatively coupled to a SCUBA diver operated reel or spool for collecting and dispensing said signal conducting tether cable, said reel or spool including a means for displaying navigation data to a SCUBA diver having possession of said reel or spool;
    determining and storing an first geographic location in computer memory;
    deploying a float assembly containing said GPS antenna on the surface of said water;
    determining a length of line/cable deployed from SCUBA diver to the float;
    determining a depth of said SCUBA diver;
    determining an azimuth direction a water current is flowing;
    determining and storing a second geographic location in said computer memory;
    correcting said second geographic position using said cable length, and said depth information and azimuth direction of said water current;
    determining and presenting the direction to proceed as calculated using said first geographic location and said correction second geographic location to said SCUBA diver to navigate to said first geographic location or other stored waypoint or a manually entered location.

12. The apparatus of claim 1 wherein said angle sensor comprises a resistive or optic component.

13. The apparatus of claim 12 wherein said resistive component is a rheostat or potentiometer.

14. The apparatus of claim 1 wherein said angle sensor comprises a tiltmeter.

15. The apparatus of claim 9 further comprising means for determining an azimuth heading a water current pushes said dive flag apparatus away from said diver location.

16. The apparatus of claim 15 wherein said means for determining an azimuth heading comprises a flux valve or a compass.

17. The apparatus of claim 16 further comprising means for determining a length of said signal conducting tether cable, said length for determining said correction vector between said diver location and said location of said dive flag apparatus.

18. The apparatus of claim 17 further comprising a single flowmeter operative for aiding in determining an azimuth heading indicative of a direction of a flow of water current.

* * * * *